(12) United States Patent
Yan et al.

(10) Patent No.: US 11,781,050 B2
(45) Date of Patent: Oct. 10, 2023

(54) AQUEOUS DISPERSION OF A SILICONE PRESSURE SENSITIVE ADHESIVE BASE AND METHODS FOR PREPARATION AND USE OF THE DISPERSION

(71) Applicants: Dow Global Technologies LLC, Midland, MI (US); Dow Silicones Corporation, Midland, MI (US)

(72) Inventors: Qiangqiang Yan, Shanghai (CN); Yunlong Guo, Shanghai (CN); Wenjie Chen, Shanghai (CN); Li Ding, Shanghai (CN); Hongyu Chen, Shanghai (CN); Cheng Shen, Shanghai (CN); Ruihua Lu, Shanghai (CN); Yan Zhou, Shanghai (CN); Zhihua Liu, Shanghai (CN)

(73) Assignees: DOW GLOBAL TECHNOLOGIES LLC, Midland, MI (US); Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/793,786

(22) PCT Filed: Jul. 21, 2021

(86) PCT No.: PCT/CN2021/107678
§ 371 (c)(1),
(2) Date: Jul. 19, 2022

(87) PCT Pub. No.: WO2023/000218
PCT Pub. Date: Jan. 26, 2023

(65) Prior Publication Data
US 2023/0193096 A1 Jun. 22, 2023

(51) Int. Cl.
*C09J 183/06* (2006.01)
*C09J 5/00* (2006.01)
*C09J 11/06* (2006.01)
*C08G 77/02* (2006.01)
*C08G 77/16* (2006.01)

(52) U.S. Cl.
CPC ............. *C09J 183/06* (2013.01); *C09J 5/00* (2013.01); *C09J 11/06* (2013.01); *C08G 77/02* (2013.01); *C08G 77/16* (2013.01); *C09J 2483/00* (2013.01)

(58) Field of Classification Search
CPC ... C09J 183/06; C09J 5/00; C09J 11/06; C09J 2483/00; C08G 77/02; C08G 77/16
See application file for complete search history.

(56) References Cited

U.S. PATENT DOCUMENTS

| | | |
|---|---|---|
| 2,676,182 A | 4/1954 | Daudt et al. |
| 3,445,420 A | 5/1969 | Kookootsedes et al. |
| 3,989,667 A | 11/1976 | Lee et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,774,310 A | 9/1988 | Butler |
| 4,906,695 A | 3/1990 | Blizzard et al. |
| 5,292,586 A | 3/1994 | Lin et al. |
| 5,708,098 A | 1/1998 | Cook et al. |
| 5,806,975 A | 9/1998 | Hosokawa et al. |
| 5,844,031 A | 12/1998 | Chen et al. |
| 5,861,450 A | 1/1999 | Chen et al. |
| 6,387,487 B1 | 5/2002 | Greenberg et al. |
| 6,545,086 B1 | 4/2003 | Kosal |
| 6,806,339 B2 | 10/2004 | Cray et al. |
| 7,728,080 B2 | 6/2010 | Aoki et al. |
| 8,017,712 B2 | 9/2011 | Berry et al. |
| 9,562,149 B2 | 2/2017 | Cray et al. |
| 9,567,458 B2 | 2/2017 | Sherman et al. |
| 9,593,209 B2 | 3/2017 | Dent et al. |
| 9,732,191 B2 | 8/2017 | Cifuentes et al. |
| 10,077,387 B2 | 9/2018 | Ding et al. |
| 2003/0088042 A1 | 5/2003 | Griswold et al. |
| 2004/0254274 A1 | 12/2004 | Griswold |
| 2005/0038188 A1 | 2/2005 | Ahn et al. |
| 2006/0251602 A1 | 11/2006 | Goddinger et al. |
| 2007/0099007 A1 | 5/2007 | Benayoun et al. |
| 2007/0289495 A1 | 12/2007 | Cray et al. |
| 2008/0171683 A1* | 7/2008 | Johnson ............... C11D 3/0031 |
| 2012/0328863 A1 | 12/2012 | Kuo |
| 2014/0357773 A1 | 12/2014 | Liles et al. |
| 2016/0053148 A1 | 2/2016 | Tsuchida |

(Continued)

FOREIGN PATENT DOCUMENTS

| | | |
|---|---|---|
| CN | 101177596 A | 5/2008 |
| CN | 107690329 | 2/2018 |

(Continued)

OTHER PUBLICATIONS

CTM 0270 Adhesion—User Selected Peel Angle—Pressure Sensitive.
DOWSIL™ Q2-7406 Safety Data Sheet.
DOWSIL™ Q2-7406 Technical Data Sheet.

*Primary Examiner* — Robert S Walters, Jr.
(74) *Attorney, Agent, or Firm* — Catherine Brown

(57) ABSTRACT

An aqueous dispersion of a silicone pressure sensitive adhesive base can be combined with a curing agent and cured to form a silicone pressure sensitive adhesive. The aqueous dispersion of the silicone pressure sensitive adhesive base includes a bis-hydroxyl-terminated polydiorganosiloxane; a polyorganosilicate resin; cumene; a surfactant; and water. A curing agent such as a peroxide compound or an aminosilane may be combined with the aqueous disperison of the silicone pressure sensitive adhesive base to form a silicone pressure sensitive adhesive composition. A pressure sensitive adhesive article may be formed by a method including coating a surface of a substrate with the silicone pressure sensitive adhesive composition, removing water, and curing the silicon pressure sensitive adhesive composition to form a silicone pressure sensitive adhesive on the surface of the substrate.

15 Claims, No Drawings

(56) References Cited

U.S. PATENT DOCUMENTS

| | | |
|---|---|---|
| 2017/0137678 A1 | 5/2017 | Ding et al. |
| 2017/0233612 A1 | 8/2017 | Han et al. |
| 2018/0105692 A1 | 4/2018 | Imaizumi et al. |
| 2020/0157395 A1 | 5/2020 | Liu et al. |

FOREIGN PATENT DOCUMENTS

| | | |
|---|---|---|
| CN | 110494528 | 11/2019 |
| CN | 111194341 | 5/2020 |
| CN | 111484827 A | 8/2020 |
| EP | 0556023 A1 | 8/1993 |
| EP | 1810993 A2 | 7/2007 |
| JP | 03516410 B2 | 4/2004 |
| JP | 04761049 B2 | 8/2011 |
| WO | 199634028 A1 | 10/1996 |
| WO | 199634029 A1 | 10/1996 |
| WO | 2009/002668 A2 | 12/2008 |
| WO | 2009/002681 A1 | 12/2008 |
| WO | 2012/094885 A1 | 7/2012 |
| WO | 2015/196400 A1 | 12/2015 |
| WO | 2019043491 A1 | 3/2019 |
| WO | 2020/000389 A1 | 1/2020 |
| WO | 2021081863 | 5/2021 |

\* cited by examiner

AQUEOUS DISPERSION OF A SILICONE PRESSURE SENSITIVE ADHESIVE BASE AND METHODS FOR PREPARATION AND USE OF THE DISPERSION

This application is a U.S. national stage filing under 35 U.S.C. § 371 claiming the benefit of PCT Application No. PCT/CN21/107678 filed on 21 Jul. 2021, currently pending. PCT Application No. PCT/CN21/107678 is hereby incorporated by reference.

CROSS REFERENCE TO RELATED APPLICATIONS

None.

TECHNICAL FIELD

This invention relates to an aqueous dispersion of a silicone pressure sensitive adhesive base and method for its preparation. The aqueous dispersion can be combined with a curing agent and cured to form a silicone pressure sensitive adhesive with good optical properties, high adhesion, and that leaves no or low residue after removal from stainless steel substrates after exposure to high temperatures.

INTRODUCTION

Silicone pressure sensitive adhesives are widely applied in a variety of large and fast-growing applications, including general purpose masking tapes/labels and protective films, in which super wetting to a substrate, stable adhesion after aging, and high/low temperature stability are desired properties. Conventional silicone pressure sensitive adhesives (Si PSAs) are delivered in solvent, such as benzene, toluene, ethyl benzene, xylene, or combinations thereof (BTEX), which will result in relatively high volatile organic compound (VOC) emission when the Si PSAs are applied to substrates, dried, and cured. Such solvent borne Si PSAs are facing growing challenges, while waterborne Si PSAs, which contain low or no amounts of solvents, are becoming more attractive to customers.

However, there are relatively few commercially available waterborne Si PSAs. U.S. Pat. No. 10,077,387 to Ding et al. discloses an emulsion type silicone pressure sensitive adhesive composition and a process for the production thereof. However, an aromatic solvent, which is a VOC, is used as a dilute agent in this composition and process, and this Si PSA may have inadequate heat resistance for certain applications.

BRIEF SUMMARY OF THE INVENTION

An aqueous dispersion of a silicone pressure sensitive adhesive base (base) comprises: a bis-hydroxyl-terminated polydiorganosiloxane, a polyorganosilicate resin, cumene, an alkyl polyglycoside surfactant, and water. The base may be combined with a curing agent comprising a peroxide or an aminosilane to form an aqueous dispersion of a silicone pressure sensitive adhesive composition (composition). The composition is curable to form a silicone pressure sensitive adhesive.

DETAILED DESCRIPTION

The aqueous dispersion of the silicone pressure sensitive adhesive base (base) introduced above comprises: (A) the bis-hydroxyl-terminated polydiorganosiloxane, which may comprise (A1) a bis-hydroxyl-terminated polydiorganosiloxane gum (gum), (A2) a bis-hydroxyl-terminated polydiorganosiloxane polymer (polymer), or (A3) a combination of both the gum and the polymer; (B) the polyorganosilicate resin, which may comprise (B1) a capped resin, (B2) an uncapped resin, or (B3) a combination of both the capped resin and the uncapped resin; (C) cumene; (D) the surfactant, which comprises (D1) the alkyl polyglycoside surfactant, and may optionally further comprise (D2) a cosurfactant; and (E) water.

(A) Bis-Hydroxyl-Terminated Polydiorganosiloxane

Starting material (A) in the base is the bis-hydroxyl-terminated polydiorganosiloxane. As introduced above, starting material (A) may comprise (A1) the gum, (A2) the polymer, or (A3) the combination of both the gum and the polymer. The amount of starting material (A) in the base depends on various factors including the species selected for (A1) the gum and/or (A2) the polymer, and the types and amounts of other starting materials in the base, however, the amount of starting material (A) may be 25 weight parts to 45 weight parts, per 100 weight parts of starting materials (A), (B), (C), and (D) combined. Alternatively, the amount of starting material (A) in the base may be at least 25, alternatively at least 26, alternatively at least 27, alternatively at least 28, alternatively at least 29, alternatively at least 30, alternatively at least 31, and alternatively at least 32 weight parts; while at the same time the amount may be up to 45, alternatively up to 44, alternatively up to 43, alternatively up to 42, alternatively up to 41, alternatively up to 40, alternatively up to 39, and alternatively up to 38 weight parts, on the same basis.

(A1) Gum

The gum may have formula:

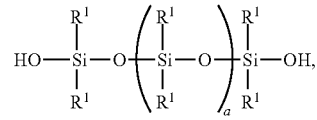

where each $R^1$ is an independently selected monovalent hydrocarbon group; and subscript a has a value sufficient to give the gum a plasticity of 20 mil (0.51 mm) to 80 mil (2.03 mm), alternatively 30 mil (0.76 mm) to 70 mil (1.78 mm), and alternatively 50 mil (1.27 mm) to 65 mil (1.65 mm), where plasticity is measured based on ASTM D926 by applying 1 kg load to a spherical sample of 4.2 g in weight for 3 minutes at 25° C. and the results are measured in thousandths of an inch (mil).

Each $R^1$ is an independently selected monovalent hydrocarbon group. The monovalent hydrocarbon group may have 1 to 18 carbon atoms. The monovalent hydrocarbon group may be free of aliphatic unsaturation. Alternatively, each $R^1$ may have 1 to 12 carbon atoms, and alternatively 1 to 6 carbon atoms. Suitable monovalent hydrocarbon groups for $R^1$ are exemplified by alkyl groups and aromatic groups such as aryl groups and aralkyl groups. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. Aryl is exemplified by, but not limited to, cyclopentadienyl, phenyl, tolyl, xylyl, anthracenyl, benzyl, 1-phenylethyl, 2-phenylethyl, and naphthyl. Alternatively, each R¹ may be independently selected from the group consisting of alkyl and aryl. Alternatively, each R¹ may be independently selected from methyl and phenyl. Alternatively, each R¹ may be alkyl. Alternatively, each R¹ may be methyl.

Bis-hydroxyl-terminated polydiorganosiloxane gums suitable for use as starting material (A1) are known in the art and may be prepared by methods such as hydrolysis and condensation of the corresponding organohalosilanes or equilibration of cyclic polydiorganosiloxanes. Examples of suitable hydroxyl-terminated polydiorganosiloxane gum for use as starting material (A1) in the base are exemplified by:
i) bis-hydroxyl-terminated polydimethylsiloxane,
ii) bis-hydroxyl-terminated poly(dimethylsiloxane/methylphenylsiloxane),
iii) bis-hydroxyl-terminated poly(dimethylsiloxane/diphenylsiloxane),
iv) phenyl,methyl,hydroxyl-siloxy-terminated polydimethylsiloxane,
v) a combination of two or more of i) to iv). Alternatively, starting material (A1) comprise bis-hydroxyl-terminated polydimethylsiloxane.

Starting material (A1), the bis-hydroxyl-terminated polydiorganosiloxane gum, may be present in the base in an amount of 10 weight parts to 20 weight parts, per 100 weight parts of starting materials (A), (B), (C), and (D) combined. Alternatively, (A1) the gum may be present in an amount of at least 10, alternatively at least 11, alternatively at least 12, alternatively at least 13, alternatively at least 14, and alternatively at least 15, weight parts; while at the same time the amount may be up to 20, alternatively up to 19, alternatively up to 18 weight parts, alternatively up to 17 weight parts, and alternatively up to 16 weight parts, on the same basis.

(A2) Polymer

Starting material (A) of the base may further comprise (A2) the a bis-hydroxyl-terminated polydiorganosiloxane polymer (polymer), introduced above. The polymer may have formula:

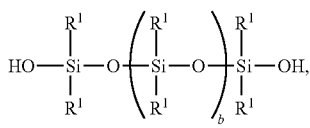

where R¹ is as described above and subscript b<subscript a. Subscript b has a value sufficient to give the polymer a viscosity≤100,000 cst measured as described in the test method, below. Alternatively, subscript b may have a value sufficient to give the polymer a viscosity of 10,000 cst to 100,000 cst; alternatively 20,000 cst to 95,000 cst; alternatively 30,000 cst to 90,000 cst; alternatively 40,000 cst to 85,000 cst; and alternatively 50,000 cst to 80,000 cst.

Polymers suitable for use in the base are known in the art and may be prepared by methods such as hydrolysis and condensation of the corresponding organohalosilanes or equilibration of cyclic polydiorganosiloxanes. Suitable polymers for use as starting material H) are exemplified by:
i) bis-hydroxyl-terminated polydimethylsiloxane,
ii) bis-hydroxyl-terminated poly(dimethylsiloxane/methylphenylsiloxane),
iii) bis-hydroxyl-terminated poly(dimethylsiloxane/diphenylsiloxane),
iv) phenyl,methyl,hydroxyl-siloxy-terminated polydimethylsiloxane,
v) a combination of two or more of i) to iv). Alternatively, the polymer may be selected from the group consisting of i), ii), and iii). Alternatively, the polymer may be i).

Starting material (A2), the bis-hydroxyl terminated polydiorganosiloxane polymer, may be present in the base in an amount of 15 to 25 weight parts, per 100 weight parts of starting materials (A), (B), (C), and (D) combined. Alternatively, (A2) the polymer may be present in an amount of at least 15, alternatively at least 16, alternatively at least 17, alternatively at least 18, alternatively at least 19, and alternatively at least 20, weight parts; while at the same time the amount may be up to 25, alternatively up to 24, alternatively up to 23 weight parts, alternatively up to 22 weight parts, and alternatively up to 21 weight parts, on the same basis.

One skilled in the art would recognize that the above amounts for starting materials (A1) and (A2) are exemplary and not limiting. When a combination of (A1) gum and (A2) polymer are used, starting materials (A1) and (A2) may be present in the base in amounts sufficient to provide a weight ratio (A1)/(A2) (Gum/Polymer ratio) of 0.1/1 to 1/1, alternatively 0.67/1 to 1/1.

(B) Polyorganosilicate Resin

Starting material (B) in the base is a polyorganosilicate resin. The polyorganosilicate resin comprises monofunctional units of formula $R^M_3SiO_{1/2}$ and tetrafunctional units ("Q" units) of formula $SiO_{4/2}$, where each $R^M$ is an independently selected monovalent hydrocarbon group, as described above for R¹. Alternatively, at least one-third, alternatively at least two thirds of the $R^M$ groups are methyl groups. Alternatively, the monofunctional units may be exemplified by $(Me_3SiO_{1/2})$ and $(Me_2PhSiO_{1/2})$; alternatively the monofunctional units may be selected from the group consisting of $(Me_3SiO_{1/2})$ and $(Me_2PhSiO_{1/2})$. The polyorganosilicate resin is typically produced in an aromatic solvent (e.g., BTEX) because the resin is solid at room temperature (RT). However, the solvent can then subsequently removed such that the resin typically has a powder or flake form.

When prepared, the polyorganosilicate resin comprises the monofunctional and tetrafunctional units described above, and the polyorganosilicate resin further comprises units with silanol (silicon bonded hydroxyl) groups and may comprise neopentamer of formula $Si(OSiR^M_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups (M units) of the resinous and neopentamer portions of the polyorganosilicate resin to the total number of silicate groups (Q units) in the resinous and neopentamer portions.

The Mn of the polyorganosilicate resin depends on various factors including the types of monovalent hydrocarbon groups represented by $R^M$ that are present. The Mn of the polyorganosilicate resin refers to the number average molecular weight measured using GPC according to the procedure in U.S. Pat. No. 9,593,209 at col. 31, Reference Example 1, when the peak representing the neopentamer is excluded from the measurement. The Mn of the polyorganosilicate resin may be at least 1,500 g/mol. At the same time, the Mn of the polyorganosilicate may be up to 15,000 g/mol. Alternatively, Mn of the polyorganosilicate resin may be >3,000 g/mol to 8,000 g/mol. Alternatively, Mn of the Resin may be 2,000 g/mol to 8,000 g/mol, alternatively 2,900 g/mol to 6,000 g/mol, and alternatively 2,900 to 5,000 g/mol.

The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and tetrafunctional units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above is uncapped and typically contains silicon bonded hydroxyl groups, e.g., of formulae, $HOSi_{3/2}$ and/or $(HO)_xR^M_{(3-x)}SiO_{1/2}$, where subscript x is 1, 2, or 3. The polyorganosilicate resin may comprise up to 2% of silicon bonded hydroxyl groups. The concentration of silicon bonded hydroxyl groups present in the polyorganosilicate resin may be determined using FTIR spectroscopy according to ASTM Standard E-168-16. To reduce the amount of silicon bonded hydroxyl groups to be below 0.7%, alternatively below 0.3%, alternatively less than 1%, and alternatively 0.3% to 0.8%, the silicon bonded hydroxyl groups formed during preparation of the polyorganosilicate resin can be converted to trihydrocarbyl-siloxane groups or to a different hydrolyzable group by a process known as capping, e.g., reacting the polyorganosilicate resin with a silane, disiloxane, or disilazane containing the appropriate terminal group. Silanes containing hydrolyzable groups may be added in molar excess of the quantity required to react with the silicon bonded hydroxyl groups on the polyorganosilicate resin, thereby forming a capped resin.

One or more polyorganosilicate resins may be combined and used in the base herein. For example, an uncapped resin having a relatively high amount of hydroxyl groups may be used in combination with a capped resin having al lower amount of hydroxyl groups than the uncapped resin. Alternatively, the resin or resins used may be capped.

Therefore, (B) the polyorganosilicate resin may comprise (B1) a capped resin as described above and (B2) an uncapped resin as described above. The capped resin may have unit formula: $(R^M_3SiO_{1/2})_z(SiO_{4/2})_oX^2_p$, where $R^M$ and $X^2$ are as described above, and subscripts z and o have values such that o>1, and subscript z>4, a quantity (o+z) has a value sufficient to give the capped resin the Mn described above (e.g., 1,500 g/mol to 5,000 g/mol, alternatively 2,000 g/mol to 5,000 g/mol, alternatively 2,500 g/mol to 4,900 g/mol, and alternatively 2,500 g/mol to 4,700 g/mol, and alternatively 2,900 g/mol to 4,700 g/mol), and subscript p has a value sufficient to give the capped resin a hydrolyzable group content as described above (e.g., 0 to <2%, alternatively 0 to 1.5%, and alternatively 0 to 1.0%). Starting material (B2), the uncapped resin, may have unit formula $(R^M_3SiO_{1/2})_{z'}(SiO_{4/2})_{o'}X^2_{p'}$, where $R^M$ and $X^2$ are as described above and subscripts z' and o' have values such that o'>1, and subscript z'>4, a quantity (o'+z') has a value sufficient to give the capped resin the Mn described above (e.g., 1,500 g/mol to 5,000 g/mol, alternatively 2,000 g/mol to 5,000 g/mol, alternatively 2,500 g/mol to 4,900 g/mol, and alternatively 2,500 g/mol to 4,700 g/mol, and alternatively 2,700 g/mol to 4,700 g/mol), and subscript p' has a value sufficient to give the uncapped resin a hydrolyzable group content as described above (e.g., ≥2% to 10%).

Suitable polyorganosilicate resins for use in the base are known in the art and are commercially available. For example, flake resins sold with tradename DOWSIL™ are commercially available from DSC. The amount of polyorganosilicate resin in the base depends on various factors including the species of resin selected and the types and amounts of other starting materials in the base, however, the amount of (B) the polyorganosilicate resin may be 40 weight parts to 55 weight parts, per 100 weight parts of starting materials (A), (B), (C), and (D) combined. Alternatively, the amounts of (B) the polyorganosilicate resin and (A) the bis-hydroxyl-terminated polydiorganosiloxane may be sufficient to provide a weight ratio of (B) polyorganosilicate resin to (A) bis-hydroxyl-terminated polydiorganosiloxane ratio [(B)/(A) ratio] of 1/1 to 1.5/1, alternatively 1.4/1 to 1.5/1.

Alternatively, when (B3) the combination of both (B1) the capped resin and (B2) the uncapped resin are used, the amount of (B1) the capped resin may be 30 weight parts to 40 weight parts, per 100 parts by weight of starting materials (A), (B), (C), and (D) combined; and the amount of (B2) the uncapped resin may be 10 weight parts to 15 weight parts of starting materials (A), (B), (C), and (D) combined. Alternatively, the amount of (B1) the capped resin may be at least 30, alternatively at least 31, alternatively at least 32, alternatively at least 33, alternatively at least 34, and alternatively at least 35 weight parts; while at the same time the amount may be up to 40, alternatively up to 39, alternatively up to 38, alternatively up to 37, and alternatively up to 36 weight parts on the same basis. Alternatively, the amount of (B2) the uncapped resin may be at least 10, alternatively at least 11, alternatively at least 12, alternatively at least 13, alternatively at least 14, and alternatively at least 15 weight parts; while at the same time the amount may be up to 20, alternatively up to 19, alternatively up to 18, alternatively up to 17, and alternatively up to 16 weight parts on the same basis.

(C) Cumene

Starting material (C) in the base described above is cumene, which has IUPAC name: (propan-2-yl)benzene. Cumene has formula

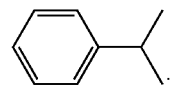

The cumene is present in the base in an amount of 1 weight part to 20 weight parts, per 100 weight parts of starting materials (A), (B), (C), and (D) combined. Alternatively, the amount of cumene may be 5 weight parts to 15 weight parts, on the same basis. Alternatively, the cumene may be present in the base in an amount of at least 1 weight part, alternatively at least 3 weight parts, alternatively at least 5 weight parts, alternatively at least 7 weight parts, alternatively at least 9 weight parts, alternatively at least 10 weight parts, alternatively at least 11 weight parts, and alternatively at least 12 weight parts; while at the same time, the amount may be up to 20 weight parts, alternatively up to 18 weight parts, alternatively up to 16 weight parts, alternatively up to 15 weight parts, alternatively up to 14 weight parts, and alternatively up to 12 weight parts, on the same bases described above.

The base described herein may be free of volatile organic compounds that have flash point<28° C., which may be undesirable to customers/end users of the base and the silicone pressure sensitive adhesive composition described herein. For example, such volatile organic compounds include volatile hydrocarbons (e.g., volatile aliphatic hydrocarbons such as heptane and volatile aromatic hydrocarbons, such as benzene, ethyl benzene, toluene, and xylene). Without wishing to be bound by theory, it is thought that cumene has a flash point of 43.9° C., which is higher than that of the volatile organic compounds described above, and, therefore cumene is not a volatile organic compound with flash point<28° C. "Free of volatile organic compounds with flash point<28° C." means that volatile organic compounds (as described above) are not intentionally added to the base, and are either not present in the base or, if introduced as an impurity in a starting material (e.g., the polyorganosilicate resin), they are not present in an amount that detrimentally affects performance of a silicone pressure sensitive adhesive prepared by curing a silicone pressure sensitive adhesive composition made with the base and the curing agent, described below.

(D) Surfactant

Starting material (D) in the base described above is a surfactant. Starting material (D) comprises (D1) the alkyl polyglycoside surfactant, and starting material (D) may optionally further comprise (D2) a cosurfactant. Starting material (D) may be one surfactant or a combination of two or more surfactants. For example, one (D1) polyglycoside surfactant may be used. Alternatively, two or more (D1) alkyl polyglycosides that differ in at least one property (e.g., molecular weight) may be used.

(D1) Alkyl Polyglycoside Surfactant

Alkyl polyglycosides are surfactants derived from sugars or starches and fatty alcohols. Alkylpolyglucosides are a class of alkylpolyglycoside derived from glucose. Alkyl polyglycosides may have general formula $R^2O—(R^3O)_c—(Z)_d$, where $R^2$ is an alkyl group, each $R^3$ is an independently selected alkylene group of 2 to 4 carbon atoms, Z is a sugar moiety (e.g., glucose moiety), subscript c is 0 to 10, and subscript x denotes the number of sugar units, per molecule. The alkyl polyglycoside may contain only one specific alkyl radical $R^2$. Alternatively, when the alkyl polyglycosides are manufactured from natural fats and oils or mineral oils, the alkyl groups, $R^2$, may be mixtures corresponding to the initial fats or oils compounds or corresponding to the particular processing of those fats and/or oils. The alkyl polyglucoside may be an alkyl polyglucoside in which each $R^2$ may comprise substantially $C_8$ and $C_{10}$ alkyl groups; substantially $C_{12}$ and $C_{14}$ alkyl groups; substantially $C_8$ to $C_{16}$ alkyl groups; or substantially $C_{12}$ to $C_{16}$ alkyl groups. $R^3$ may be a linear or branched alkylene group. Alternatively, $R^3$ may be linear. Alternatively, $R^3$ may be selected from the group consisting of ethyelene and propylene. Any mono- or oligosaccharides can be used as the sugar moiety Z. Alternatively, sugars having 5 or 6 carbon atoms in the sugar moiety Z, as well as the corresponding oligosaccharides, may be used. Such sugars are, for example, glucose, fructose, galactose, arabinose, ribose, xylose, lyxose, allose, altrose, mannose, gulose, idose, talose, and sucrose. Alternatively, the sugar moiety Z may be derived from glucose, fructose, galactose, arabinose, and sucrose. Alternatively, the sugar moiety Z may be derived from glucose. The alkyl polyglycosides useful herein may contain on average 1 to 6 sugar units, per molecule (where subscript d has an average value of 1 to 6). Alternatively, subscript d may have an average value of 1.1 5o 5, alternatively 1.1 to 2.0. Alternatively, subscript d may be 1.1 to 1.8. Alternatively, alkoxylated homologs of the aforesaid alkyl polyglycosides can also be used according to the present invention. These homologs can contain, on average, up to 10 ethylene oxide and/or propylene oxide units per alkyl glycoside unit. Alkyl polyglycosides, such as alkyl polyglucosides, are known in the art, for example, see Published Patent Application WO 2004/073665 A1. Alkyl polyglycosides, such as alkyl polyglucosides are commercially available. For example, a $C_9$-$C_{11}$ alkyl oligomeric d-glucopyranoside is commercially available as Green APG IC911 from Shanghai Fine Chemical Co. LTD of China. Other alkyl polyglucosides are known in the art and are commercially available, e.g., under the tradename TRITON™ BG and TRITON™ CG Alkyl Polyglucoside Surfactants from TDCC.

(D2) Cosurfactant

Starting material (D2) is an optional cosurfactant that differs from (D1) the alkyl polyglycoside described above. The cosurfactant may be an anionic surfactant, such as a salt of an alkyl alkoxylate sulfate. Alternatively, the cosurfactant may be a nonionic surfactant, such as a polyvinyl alcohol compound.

The anionic surfactants useful herein include (i) sulfonic acids and their salt derivatives, including alkyl, aralkyl, alkyl naphthalene, alkyl diphenyl ether sulfonic acids, and their salts, having at least 6 carbon atoms in the alkyl substituent, such as dodecyl benzene sulfonic acid, and its sodium salt or its amine salt; (ii) alkyl sulfates having at least 6 carbon atoms in the alkyl substituent, such as sodium lauryl sulfate; (iii) the sulfate esters of polyoxyethylene monoalkyl ethers; (iv) long chain carboxylic acid surfactants, such as lauric acid, steric acid, oleic acid, and their alkali metal and amine salts. Some other examples of anionic surfactants are sulfonated glyceryl esters of fatty acids such as sulfonated monoglycerides of coconut oil acids; salts of sulfonated monovalent alcohol esters such as sodium oleyl isothionate; sulfonated aromatic hydrocarbons such as sodium alpha-naphthalene monosulfonate; alkali metal alkyl sulfates; ether sulfates having alkyl groups of eight or more carbon atoms such as sodium lauryl ether sulfate; and alkylaryl sulfonates having one or more alkyl groups of eight or more carbon atoms such as neutral salts of hexadecylbenzene sulfonic acid and $C_{20}$ alkylbenzene sulfonic acid.

Commercial anionic surfactants which can be used include the sodium salt of dodecyl benzene sulfonic acid sold under the trademark SIPONATE™ DS-10 by Alcolac Inc., Baltimore, Md.; sodium salt of alkyl alkoxylate sulfate sold under the trademark DOWFAX™ AS-801 by The Dow Chemical Company of Midland, Mich., USA; and linear alkyl benzene sulfonic acids sold under the trademark BIO-SOFT™ S-100 by the Stepan Company, Northfield, Ill. Compositions of the latter type such as dodecyl benzene sulfonic acid, although a catalyst as noted above, can also function as the anionic surfactant when neutralized. Other suitable surfactants include sodium alkyl sulfonate such as HOSTAPUR™ SAS-30, The amount of the anionic surfactant depends on various factors, including the selection and amount of starting material (D1), the alkyl polyglycoside surfactant, that is present, however the amount of anionic surfactant may be 0 to 5%, alternatively 0 to 3%, based on weight of silicone polymer and resins.

Polyvinyl alcohol compounds suitable for use as the cosurfactant herein are known in the art and are disclosed, for example in U.S. Patent Application Publication 20007/0099007 at paragraphs [0172] and [0173]. Polyvinyl alcohol compounds may be made by saponification of polyvinylacetate, so up to 15% of polyvinylacetate may remain in the polyvinyl alcohol compound used herein. Alternatively, the polyvinyl alcohol compound may be 80% to 98% polyvinyl alcohol (with the balance being 20% to 2% polyvinylacetate). The polyvinyl alcohol compound may have a minimum viscosity of 5 cP at 4% aqueous solution at 20° C. Polyvinyl alcohol is commercially available, e.g., GOHSENOL GH-17 from Nippon Gohsei. The amount of the polyvinyl alcohol compound depends on various factors, including the selection and amount of starting material (D1), the alkyl polyglycoside surfactant, that is present, however the amount of polyvinyl alcohol may be 0 to 5%, alternatively 0 to 3%, based on weight of silicone polymer and resins.

The amount of (D) the surfactant in the base depends on various factors including the species and amounts of starting materials (A) and (B), and whether a cosurfactant is present. However, the amount of (D) the surfactant may be 2 weight parts to 15 weight parts, per 100 weight parts of starting materials (A), (B), (C), and (D) combined. Alternatively, the amount of (D1) the alkyl polyglycoside surfactant may be 2 weight parts to 10 weight parts, per 100 weight parts of starting materials (A), (B), (C), and (D) combined. Alternatively, the amount of (D1) the alkyl polyglycoside surfactant may be at least 2, alternatively at least 3, and alternatively at least 4, weight parts; while at the same time the amount may be up to 10, alternatively up to 8, alternatively up to 6 weight parts, on the same basis. Alternatively, the amount of (D2) the cosurfactant may be 0 to 5 weight parts, per 100 weight parts of starting materials (A), (B), (C), and (D) combined. Alternatively, the amount of (D2) the cosurfactant may be at least 0.1 weight part, alternatively at least 0.2 weight part, alternatively at least 0.3 weight part, and alternatively at least 0.4 weight part; while at the same time the amount may be up to 5 weight parts, alternatively up to 3 weight parts, alternatively up to 1 weight part, and alternatively up to 0.5 weight part, on the same basis.

(E) Water

Starting material (E) in the base is water. The water is not generally limited, and may be utilized neat (i.e., absent any carrier vehicles/solvents), and/or pure (i.e., free from or substantially free from minerals and/or other impurities). For example, the water may be processed or unprocessed before being added to the base described above. Examples of processes that may be used for purifying the water include distilling, filtering, deionizing, and combinations of two or more thereof, such that the water may be deionized, distilled, and/or filtered. Alternatively, the water may be unprocessed (e.g. may be tap water, i.e., provided by a municipal water system or well water, used without further purification).

The water may be utilized in any amount and the exact amount may be selected by one of skill in the art, depending on various factors, e.g., the equipment to be used for preparing the base and the scale. However, the amount of water may be 30 weight parts to 80 weight parts, per 100 weight parts of starting materials (A), (B), (C), and (D) combined. Alternatively, the amount of water may be higher than 80 weight parts, for example, if the base is further diluted before use, depending on the end use application. Alternatively, the amount of water may be lower than 30 weight parts, if less than 30 weight parts is sufficient to form the aqueous dispersion.

(F) Biocide

The base described above may optionally further comprise starting material (F), a biocide. Biocides are known in the art and are commercially available. For example, the biocide may be a preservative such as BIOBAN™ products) or KATHON™ products, which is an aqueous preservative comprising 5-chloro-2-methyl-4-isothiazolin-3-one and 2-methyl-4-isothiazolin-3-one. Alternatively, the biocide may comprise an algicide, such as KLARIX™ algicides, e.g., BIOBAN™, KATHON™, KLARIX™ and other biocides are commercially available from The Dow Chemical Company of Midland, Mich., USA. The biocide may be added in an amount of 0 to 5 weight parts, alternatively 0.1 weight part to 5 weight parts, per 100 weight parts of starting materials (A), (B), (C), and (D) combined.

Method of Making the Base

The base described above can be prepared by a method comprising:

1) dissolving (B) the polyorganosilicate resin in (C) the cumene to form a solution, and 2) emulsifying the solution, (A) the bis-hydroxyl-terminated polydiorganosiloxane, (D) the surfactant, and (E) the water. The method may further comprise 3) adding an additional starting material, as described above, in step 1) and/or step 2). The method may further comprise 4) diluting the base with additional water.

Steps 1) and 2) may be performed by any convenient means, such as mixing at RT or elevated temperature, in batch, semi-batch, or continuous equipment. Mixing in step may occur, for example using, batch mixing equipment with medium/low shear such as change-can mixers, double-planetary mixers, conical-screw mixers, ribbon blenders, double-arm or sigma-blade mixers. Alternatively, batch equipment with high-shear and/or high-speed dispersers can be used in step 1) and/or step 2), and these include equipment such as that made by Charles Ross & Sons (NY), Hockmeyer Equipment Corp. (NJ); batch mixing equipment such as those sold under the tradename Speedmixer™; and batch equipment with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (NJ); extruders such as twin-screw counter-rotating extruders, two-stage extruders, twin-rotor continuous mixers, dynamic or static mixers or combinations of these equipment.

The base prepared as described herein may form an oil in water (o/w) type dispersion, i.e., the dispersion comprises an oil phase dispersed in an aqueous phase. The oil phase will comprise (A) the bis-hydroxyl-terminated polydiorganosiloxane, (B) the polyorganosilicate resin, (C) the cumene, and (D) the surfactant. The starting materials may be combined concurrently in step 2), or aliquots of one or more starting materials may be added. For example, water may be added in one or more aliquots during step 2), and when more than one aliquot is used, the method may comprise mixing between additions. One skilled in the art would be able to select portions of the starting materials for combining, depending on the selection of the quantity used and the specific mixing techniques utilized to combine the starting materials.

The method may optionally further comprise 5) devolatilizing the base. Devolatilizing may be performed by any convenient means, such as heating the base under vacuum. Devolatilizing may be performed during water addition or before addition of the last aliquot of water to compensate for any water which may be removed during devolatilization. Devolatilizing may be performed, for example, with a devolatilizing extruder.

Silicone Pressure Sensitive Adhesive Composition

The base prepared as described above, may be used to make the silicone pressure sensitive adhesive composition by a method comprising: combining (I) the base with (II) a curing agent. The curing agent may be a (II-1) a peroxide compound or (II-2) an aminosilane.

(II-1) Peroxide Curing Agent

The peroxide compound is selected depending on various factors, including the species and amount of (A) the bis-hydroxyl-terminated polydiorganosiloxane used in (I) the base. Without wishing to be bound by theory, it is thought that the mechanism of a peroxide curing system is that the peroxide forms a radical to extract a hydrogen from an $R^1$ group, such as a methyl group, of (A) the bis-hydroxyl-terminated polydiorganosiloxane described above, and generates an active silicon-carbon radical. Subsequently, the resulting intermediate undergoes a cross-linking reaction to finish the curing process. Phenyl and primary carbon free radicals can cure the silicone pressure sensitive adhesive composition described herein. Therefore, the peroxide compound may be selected from the group consisting of benzoyl peroxide (BPO), 2,4-dichlorobenzoyl peroxide, dilauroyl peroxide, tert-pentyl 3,5,5-trimethylhexaneperoxoate, and a combination thereof. Alternatively, the peroxide compound may be benzoyl peroxide. Suitable peroxide compounds are commercially available, for example, aqueous peroxide compositions are available under the tradename LUPEROX™ from Sigma-Aldrich, Inc. of St. Louis, Mo., USA.

The amount of the peroxide compound depends on various factors including the species of peroxide compound selected and the species and amounts of the starting materials in the base, however, the amount of the peroxide compound may be 0.5 weight part to 6 weight part, per 100 parts by weight of starting materials (A), (B), (C), and (D) combined. Alternatively, the amount of peroxide compound may be at least 0.5, alternatively at least 0.6, alternatively at least 0.7, alternatively at least 0.75 weight parts; while at the same time the amount of peroxide compound may be up to 6, alternatively up to 3, alternatively up to 1, alternatively up to 0.8 weight part, on the same basis.

Aminosilane Curing Agent

Alternatively, the (II) curing agent may comprise (II-2) an aminosilane such as the aminosilane disclosed in U.S. Pat. No. 4,906,695 to Blizzard et al. The aminosilane may have general formula:

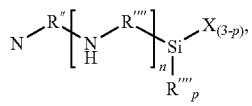

where R" represents a divalent hydrocarbon group of 2 to 4 carbon atoms such as ethylene, trimethylene, or tetramethylene; R'" is a divalent hydrocarbon group having 3 to 6 carbon atoms such as trimethylene, tetramethylene, methyltrimethylene, pentamethylene and hexamethylene; subscript n is 0, 1, or 2, subscript p is 0 or 1, R"" is a hydrocarbyl group such as alkyl (e.g., methyl, ethyl, propyl, butyl, or phenyl) or aryl (e.g., phenyl), and X is a hydrolyzable moiety, which may be an alkoxy group (e.g., methoxy or ethoxy), acyloxy group (e.g., acetoxy), or halogen (e.g., Cl). Suitable aminosilanes include, for example, N-gamma-aminopropyltriethoxysilane, N-beta-aminoethyl-gamma-aminoisobutyltrimethoxysilane, and N-beta-aminoethyl-gammamaaminopropyltrimethoxysilane. Suitable aminosilanes are commercially available. For example, XIAMETER™ OFS-6020 Silane and DOWSIL™ Z-6026 Silane are available from DSC.

The amount of (II-2) the aminosilane depends on various factors including the species of aminosilane selected and the species and amounts of the starting materials in the base, however, the amount of the aminosilane may be 0.1 weight part to 6 weight parts, per 100 weight parts of starting materials (A), (B), (C), and (D), combined. Alternatively, the amount of the aminosilane may be at least 0.1, alternatively at least 0.2, and alternatively at least 0.25 weight parts; while at the same time the amount of peroxide compound may be up to 6, alternatively up to 3, alternatively up to 0.6, alternatively up to 0.5, alternatively up to 0.4 weight parts, on the same basis.

The techniques and apparatus as described above may be used to combine the base and the curing agent to form the silicone pressure sensitive adhesive composition (composition). For example, the composition may be performed by mixing at RT.

Method of Use

The composition prepared as described above may be used to form an adhesive article, e.g., a silicone pressure sensitive adhesive prepared by a method comprising:
optionally i) treating a surface of a substrate,
ii) coating the surface of the substrate with the aqueous dispersion of the silicone pressure sensitive adhesive composition, as described above,
iii) removing water, and
iv) curing the silicone pressure sensitive adhesive composition to form a silicone pressure sensitive adhesive on the surface of the substrate.

Treating the surface of the substrate is optional and may be performed by any convenient means, such as cleaning the substrate, e.g., by washing with an alcohol, such as isopropanol, plasma treatment, corona discharge treatment, etching, and/or applying a primer. One skilled in the art would be able to select an appropriate treatment based on various factors including the type of substrate selected.

Applying the curable silicone pressure sensitive adhesive emulsion to the substrate can be performed by any convenient means. For example, the curable silicone pressure sensitive adhesive emulsion may be applied onto a substrate by gravure coater, comma coater, offset coater, offset-gravure coater, roller coater, reverse-roller coater, air-knife coater, or curtain coater.

The substrate can be any material that can withstand the treatment conditions (described above) and curing conditions (described below) used to cure the silicone pressure sensitive adhesive composition to form the silicone pressure sensitive adhesive on the substrate. For example, any substrate that can withstand heat treatment at a temperature equal to or greater than 180° C., alternatively 150° C. is suitable. Examples of materials suitable for such substrates including polymeric films such as polyester, polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), thermoplastic polyurethane (TPU), polyethylene (PE), or polypropylene (PP). Alternatively, the substrate may be glass. The thickness of the substrate is not critical, however, the thickness may be 5 µm to 300 µm, alternatively 50 µm to 250 µm, alternatively 100 µm to 300 µm, alternatively 100 µm, and alternatively 50 µm. Alternatively, the substrate may be selected from the group consisting of PET, TPU, PC, and glass. Alternatively, the substrate may be a polymeric substrate, such as PET.

An adhesive article such as a film or tape may be prepared by applying the curable silicone pressure sensitive adhesive emulsion onto the substrate and curing, as described above. The method for preparing the adhesive article may further comprise removing the all, or a portion, of the water before and/or during curing, i.e., steps iii) and iv) of the method described above may be performed concurrently. Removing water may be performed by any convenient means, such as heating at a temperature that vaporizes the water without fully curing, e.g., heating at a temperature of 70° C. to 90° C., alternatively 50° C. to <100° C., and alternatively 70° C. to 80° C. for a time sufficient to remove all or a portion of the water (e.g., 30 seconds to 1 hour, alternatively 1 minute to 5 minutes).

Curing may be performed by heating at a temperature of 80° C. to 200° C., alternatively 90° C. to 180° C., alternatively 100° C. to 180° C., and alternatively 110° C. to 180° C. for a time sufficient to cure (e.g., for 30 seconds to an hour, alternatively 1 min to 5 min). Curing may be performed by placing the substrate in an oven. The amount of the composition to be applied to the substrate depends on the specific application, however, the amount may be sufficient such that after curing thickness of the silicone pressure sensitive adhesive may be 5 µm to 100 µm, and for protective film the thickness may be 5 µm to 50 µm, alternatively 10 µm to 40 µm, and alternatively 15 µm to 40 µm.

The method described herein may optionally further comprise applying a removable release liner to the silicone pressure sensitive adhesive opposite the substrate, e.g., to protect the silicone pressure sensitive adhesive before use of the adhesive article. The adhesive article may be a protective film for use in a display device. Alternatively, the adhesive article may be an industrial tape. Alternatively, adhesive article may be useful in healthcare or personal care applications.

Examples

The starting materials used in the following illustrative examples are described in Table 1.

TABLE 1

| Starting Materials | |
|---|---|
| Abbreviation | Chemical Description |
| Gum 1 | Bis-OH-terminated polydimethylsiloxane with unit formula $M^{OH}_2D_{5836}$ and plasticity of 1.501 mm, SILASTIC ™ SGM-36 from Dow Silicones Corporation |
| Polymer 1 | Bis-OH-terminated polydimethylsiloxane with viscosity = 80,000 cP and silanol content = 325 ppm, from DSC |
| Capped Resin 1 | Flake type resin including methyl end capped MQ, high molecular weight, from DSC |
| Uncapped Resin 1 | Flake type MQ resin, uncapped, with silanol content 3.2%, from DSC |
| Uncapped | 70% OH-functional MQ resin dissolved |

TABLE 1-continued

| Starting Materials | |
|---|---|
| Abbreviation | Chemical Description |
| Resin 2 | in 30% BTEX solvent (i.e., a mixture of benzene, toluene, ethyl benzene and xylene), where the resin has hydroxyl content = 3.2%, M/Q ratio = 0.72, and number average molecular weight = 4693 g/mol (Mn), from DSC |
| Capped Resin 2 | 63% Methyl-capped MQ resin dissolved in 37% BTEX solvent, from DSC |
| OCS | a commercially available polyether modified MQ resin in a polyether carrier, which has been diluted to a concentration of 50% in water to form a solution, 2-3216 INT from DSC |
| Organic Surfactant 1 | sodium salt of alkyl alkoxylate sulfate, 50% in water, 50%, DOWFAX ™ AS-801 from TDCC |
| Organic Surfactant 2 | c9-11 alkyl glucosides (50-52%) in water (48-50%) Green APG IC911 from DIS |
| PVOH | Poval ™ PVA-220, powder, 100%, from Kuaray company |
| Cumene | Isopropylbenzene from Sinopharm |
| DIBK | 2,6-Dimethyl-4-heptanone from DIS |
| DMM | Dipropyleneglycol dimethyl ether from DIS |
| DOWSIL ™ OS-20 | Octamethyltrisiloxane from DSC |
| IDD | Isododecane from Sinopharm |
| Water | Water |
| Curing Agent 2 | aminoethylaminopropyl trimethoxylsilane from DSC |
| BPO | Mixture of 75% benzoyl peroxide and 25% water |
| Dispersant 1 PPH | 1-phenoxy-2-propanol, 100% DOWANOL ™ from TDCC |
| Dispersant 2 EPH | 2-phenoxyethan-1-ol |
| Biocide 1 | emulsion, 1.5% solid content |

In this Comparative Example 1, Sample CE1 was prepared according to U.S. Pat. No. 10,077,387, as follows: 8.5 parts of Gum 1 and 12.6 parts of Polymer 1 were mixed with 16.4 parts of Uncapped Resin 2 and 23.1 parts of Capped Resin 2 with (B)/(A) ratio of 1.4. The above was mixed with 6 parts of OCS to get a homogeneous mixture. Then 6 parts water was added with high shearing to form a thick O/W (oil in water) phase emulsion. 27.4 parts of water was added to dilute this emulsion to get the final aqueous dispersion of a silicone pressure sensitive adhesive base (base). The average particle size of the base was 0.3-0.4 um.

In this Comparative Example 2, Sample CE2, an aqueous dispersion of a silicone pressure sensitive adhesive base, was prepared as follows: 25.19 parts of Capped Resin 1 and 7.98 parts of Uncapped Resin 1 were dissolved in 8.4 parts of DIBK at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min. Then 30.6 g water was gradually added under stirring to prepare the base.

In this Comparative Example 3, Sample CE3, an aqueous dispersion of a silicone pressure sensitive adhesive base, was prepared as follows: 25.19 parts of Capped Resin 1 and 7.98 parts of Uncapped Resin 1 were dissolved in 8.4 parts of DMM at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min. Then 30.6 g water was gradually added under stirring to prepare the base.

In this Comparative Example 4, Sample CE4, an aqueous dispersion of a silicone pressure sensitive adhesive base, was prepared as follows: 25.19 parts of Capped Resin 1 and 7.98 parts of Uncapped Resin 1 were dissolved in 8.4 parts of heptane at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min. Then 30.6 g water was gradually added under stirring to prepare the base.

In this Comparative Example 5, Sample CE5, an aqueous dispersion of a silicone pressure sensitive adhesive base, was prepare as follows: 25.19 parts of Capped Resin 1 and 7.98 parts of Uncapped Resin 1 were dissolved in 8.4 parts of DOWSIL™ OS-20 at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming a base. The average particle size of base was 0.87 um.

In this Comparative Example 6, an aqueous dispersion of a silicone pressure sensitive adhesive base was prepared as follows: 25.19 parts of Capped Resin 1 and 7.98 parts of Uncapped Resin 1 were dissolved in 8.4 parts of IDD at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming a base. The average particle size of the base was 0.44 um.

In this Working Example 1, Sample WE1, an aqueous dispersion of a silicone pressure sensitive adhesive base was prepared as follows: 25.19 parts of Capped Resin 1 and 7.98 parts of Uncapped Resin 1 were dissolved in 8.4 parts of Cumene at room temperature. Then 11.39 parts of Polymer 1 and 10.14 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming the base. The average particle size of the base was 0.35 um.

In this Working Example 2, Sample WE2, an aqueous dispersion of a silicone pressure sensitive adhesive base was prepared as follows: 25.1 parts of Capped Resin 1 and 7.98 parts of Uncapped Resin 1 were dissolved in 8.4 parts of cumene at room temperature. Then 13.67 parts of Polymer 1 and 7.95 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming the base. The average particle size of the base was 0.25 um.

In this Working Example 3, Sample WE3, an aqueous dispersion of a silicone pressure sensitive adhesive base was prepared as follows: 21.59 parts of Capped Resin 1 and 6.84 parts of Uncapped Resin 1 were dissolved in 8.4 parts of Cumene at room temperature. Then 13.29 parts of Polymer 1 and 12.21 parts of Gum 1 were added into the above resin solution at 50-80° C. for 3-6 hours. The resulting mixture was mixed with 6.3 parts of Organic Surfactant 2 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming a base. The average particle size of the base was 0.23 um.

In this Working Example 4, Sample WE4, an aqueous dispersion of a silicone pressure sensitive adhesive base, was prepare as follows: 25.19 parts of Capped Resin 1 and 7.98 parts of Uncapped Resin 1 were dissolved in 8.4 parts of cumene at room temperature. Then 11.39 parts of Polymer 1 and 10.14 parts of Gum 1 were added into the above resin solution at 50-80° C. for 3-6 hours. The resulting mixture was mixed with 5.67 parts of Organic Surfactant 2 and 0.63 parts of Organic Surfactant 1 by the FlackTek SpeedMixer™ DAC 150.1 FV-K at 3500 rpm for 2 min or batch mixer at 800 rpm for at least 5 min to form a thick O/W (oil in water) phase. Then 30.6 g water was gradually added under stirring until forming a base. The average particle size of the base was 0.42 um.

In this Working Example 5, Sample WE5, an aqueous dispersion of a silicone pressure sensitive adhesive base, was prepared as follows: 10 parts of PVA 220 were dissolved in 90 parts of deionized water by stirring at 80° C. for 3 hours to give PVOH clear solution with 10% solid content, which was then cooled to room temperature. 25.19 parts of Capped Resin 1 and 7.98 parts of Uncapped Resin 1 were dissolved in 8.4 parts of Cumene at room temperature. Then 11.39 parts of Polymer 1 and 10.14 parts of Gum 1 were added into the above resin solution at 50-80° C. for 3-6 hours. The resulting mixture was mixed with 5.67 parts of Organic Surfactant 2 and 3.15 parts of PVA-220 solution by the FlackTek SpeedMixer™ DAC 150.1 FV-K at 3500 rpm for 2 min or batch mixer at 800 rpm for at least 5 min to form a thick O/W (oil in water) phase. Then 28.08 g water was gradually added under stirring until forming the base. The average particle size of the base was 0.55 um.

In this Reference Example 1, the bases prepared as described above were used to make aqueous dispersions of silicone pressure sensitive adhesive compositions by combining each base and a curing agent. The peroxide curing agent was prepared by mixing 50 g BPO and 50 g Dispersant 1, PPH, for 30 mins to get the peroxide curing agent, which had a benzoyl peroxide content of 37.5%.

Two silicone pressure sensitive adhesive compositions were prepared by mixing a portion of each base (10 g) prepared as described above with 0.5 g the peroxide curing agent, prepared as described above, or 0.19 g of the aminosilane in Table 1. Each composition was mixed using the FlackTek SpeedMixer™ DAC 150.1 FV-K at 3500 rpm for 2 min or batch mixer at 800 rpm for at least 5 min. The resulting compositions were coated on PET films of thickness 50 um and cured at 80° C. for 2 min and 170° C. for 3 min to obtain silicone pressure sensitive adhesive films on the PET. The Si-PSA film thickness could be controlled at 30-35 um.

In this Reference Example 2, the samples prepared as described above were tested as follows:

Film appearance was evaluated visually.

Adhesion was tested according to CTM 0270 ADHESION—USER SELECTED PEEL ANGLE—PRESSURE SENSITIVE, as follows:
1) Cut coated crepe paper as 1 inch wide tape and adhesion on cleaned standard steel plate.
2) Place it under room temperature for 30 min.
3) And then peel the Si-PSA tape by the adhesion test machine.

Heat resistance was tested according to the following test method:
1) Cut coated crepe paper as 1 inch wide tape and adhesion on cleaned standard steel plate. Two samples were prepared using each composition.
2) Place the samples under room temperature for 30 min.
3) Place the samples into an oven at 200° C. for 30 min.
4) Peel one sample of the tape while the sample was at 200° C., and check the residual and migration visually. This is referred to as "Hot peel".
5) Take out the steel plate with tape adhered thereto, and place it outside until cooling to room temperature. Then peel the tape, and check the residual and migration visually. This is referred to as "Cold peel".
6) Rank the residual on a scale of 0 to 5, with 0 being the best (least residual) and 5 being the worst (most residual).

The results of film appearance, adhesion and heat resistance including cold or hot peel are shown below in Tables 2 and 3.

In Table 2, "N/A" denotes not applicable. Samples failed because they did not form a stable aqueous dispersion and could not be tested. In tables 2 and 3, heat resistance values≤2 were desirable, and >2 were undesirable. For a Si PSA to pass, both hot peel and cold peel tests using both curing agents had to have a value of no more than 2 to pass the heat resistance. Samples with transparent appearance were also desirable. Samples with adhesion>700 g/in were desirable.

TABLE 3

| | Working Examples | | | | |
|---|---|---|---|---|---|
| Starting Material | WE1 | WE2 | WE3 | WE4 | WE5 |
| Gum 1 | 10.14 | 7.95 | 12.21 | 10.14 | 10.14 |
| Polymer 1 | 11.39 | 13.67 | 13.29 | 11.39 | 11.39 |
| Capped Resin 1 | 25.19 | 25.1 | 21.59 | 25.19 | 25.19 |
| Uncapped Resin 1 | 7.98 | 7.98 | 6.84 | 7.98 | 7.98 |
| Cumene | 8.4 | 8.4 | 8.4 | 8.4 | 8.4 |
| Organic Surfactant 2 | 6.3 | 6.3 | 6.3 | 5.67 | 5.67 |
| DOWFAX ™ AS-801 | 0 | 0 | 0 | 0.63 | 0 |
| PVA-220 solution (10% solid content) | 0 | 0 | 0 | 0 | 3.15 |
| Particle size (D50/D90, μm) | 0.35/0.68 | 0.25/0.58 | 0.23/0.56 | 0.42/0.99 | 0.55/1.23 |
| Film appearance with peroxide curing agent | Transparent and yellow | Transparent and yellow | Transparent and yellow | Transparent and yellow | Transparent and yellow |

TABLE 2

| | Comparative Examples | | | | | |
|---|---|---|---|---|---|---|
| Starting Material | CE1 | CE2 | CE3 | CE4 | CE5 | CE6 |
| Gum 1 | 8.5 | 10.14 | 10.14 | 10.14 | 10.14 | 10.14 |
| Polymer 1 | 12.6 | 11.39 | 11.39 | 11.39 | 11.39 | 11.39 |
| Capped Resin 1 | 0 | 25.19 | 25.19 | 25.19 | 25.19 | 25.19 |
| Uncapped Resin 1 | 0 | 7.98 | 7.98 | 7.98 | 7.98 | 7.98 |
| Uncapped Resin 2 | 16.4 | 0 | 0 | 0 | 0 | 0 |
| 5-7104 High Solids Int | 23.1 | 0 | 0 | 0 | 0 | 0 |
| 2,6-Dimethyl-4-heptanone (DIBK) | 0 | 8.4 | 0 | 0 | 0 | 0 |
| Dipropyleneglycol dimethyl ether (DMM) | 0 | 0 | 8.4 | 0 | 0 | 0 |
| Heptane | 0 | 0 | 0 | 8.4 | 0 | 0 |
| DOWSIL ™ OS-20 | 0 | 0 | 0 | 0 | 8.4 | 0 |
| IDD | 0 | 0 | 0 | 0 | 0 | 8.4 |
| Organic Surfactant 2 | 0 | 6.3 | 6.3 | 6.3 | 6.3 | 6.3 |
| OCS | 6 | 0 | 0 | 0 | 0 | 0 |
| Particle size (D50/D90, μm) | Not Measured | Fail | Fail | Fail | 0.87/1.56 | 0.44/0.87 |
| Film appearance with peroxide curing agent | Transparent and whitening | N/A | N/A | N/A | Opaque and yellow | Transparent and yellow |
| Adhesion (g/in) with peroxide curing agent | 580 | N/A | N/A | N/A | 670 | 720 |
| Heat resistance (200° C. hot peel) with peroxide curing agent | 5 | N/A | N/A | N/A | 2 | >0 to 1 |
| Heat resistance (200° C. cold peel) with peroxide curing agent | 0 | N/A | N/A | N/A | 0 | 0 |
| Film appearance with aminosilane curing agent | Transparent and whitening | N/A | N/A | N/A | Opaque and yellow | Transparent and yellow |
| Adhesion (g/in) with aminosilane curing agent | 680 | N/A | N/A | N/A | 820 | 850 |
| Heat resistance (200° C. hot peel) with aminosilane curing agent | 5 | N/A | N/A | N/A | 2 | 5 |
| Heat resistance (200° C. cold peel) with aminosilane curing agent | 5 | N/A | N/A | N/A | 0-1 | 0-1 |

TABLE 3-continued

Working Examples

| Starting Material | WE1 | WE2 | WE3 | WE4 | WE5 |
|---|---|---|---|---|---|
| Adhesion (g/in) with peroxide curing agent | 768 | 731 | 768 | 731 | 768 |
| Heat resistance (200° C. hot peel) with peroxide curing agent | 0 | 0 | 0 | 0 | 0 |
| Heat resistance (200° C. cold peel) with peroxide curing agent | 0 | 0 | 0 | 0 | 0 |
| Film appearance with aminosilane curing agent | Transparent and yellow | Transparent and yellow | Transparent and yellow | Transparent and yellow | Transparent and yellow |
| Adhesion (g/in) with aminosilane curing agent | 850 | 780 | 730 | 778 | 723 |
| Heat resistance (200° C. hot peel) with aminosilane curing agent | 2 | 1 | 2 | 2 | 1 |
| Heat resistance (200° C. cold peel) with aminosilane curing agent | 0 to 1 | 0 to 1 | 0 to 1 | 0 to 1 | 0 to 1 |

INDUSTRIAL APPLICABILITY

An aqueous dispersion of a silicone pressure sensitive adhesive composition prepared using the base and curing agent described above can be applied to a substrate and cured with a beneficial combination of properties. The silicone pressure sensitive adhesive made as described above has a transparent appearance, adhesion>700 g/in to polyethyelene terephthalate (PET) film, and excellent heat resistance (with a value≤2), regardless of curing agent selected, when tested according to both the hot peel and cold peel tests described in the Reference Examples described above. Without wishing to be bound by theory, it is thought that the use of the alkyl polyglycoside surfactant, particularly in combination with the use of cumene, provides a synergistic effect resulting in the Si PSA made from the aqueous dispersion of the silicone pressure sensitive adhesive base achieving this combination of properties.

Usage of Terms

The BRIEF SUMMARY OF THE INVENTION and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. terms "aqueous dispersion of a silicone pressure sensitive adhesive base" and "base" refer to an oil in water type dispersion including starting materials (A), (B), (C), and (D), as described above, but not including a curing agent (II) also described above. Said base may further comprise additional, optional starting materials, excluding the curing agent (II) described above. The term "aqueous dispersion of a silicone pressure sensitive adhesive composition" and "composition" refer to a combination prepared by combining a curing agent (II) as described above with the base. Said composition may further comprise additional, optional starting materials, as described above with respect to the base, however, one skilled in the art would recognize that one or more of the additional starting materials may be added to the base before combination with the curing agent, or one or more of the additional starting materials may be added to the composition (i.e., after combining the base and curing agent).

The disclosure of ranges includes the range itself and also anything subsumed therein, as well as endpoints. For example, disclosure of a range of 1 to 20 includes not only the range of 1 to 20, including endpoints, but also 1, 4, 6.5, 10, 15, 16, and 20 individually, as well as any other number subsumed in the range. Furthermore, disclosure of a range of, for example, 1 to 20 includes the subsets of, for example, 1 to 6, 7 to 13, and 14 to 20, as well as any other subset subsumed in the range. Similarly, the disclosure of Markush groups includes the entire group and also any individual members and subgroups subsumed therein. For example, disclosure of the Markush group alkyl, alkenyl, and aryl includes the member alkyl individually; the subgroup alkyl and aryl; and any other individual member and subgroup subsumed therein.

Abbreviations used in this application are as defined below in Table 5.

TABLE 5

| Abbreviation | Definition |
|---|---|
| ° C. | Degrees Celsius |
| cm | centimeter |
| cst | units for dynamic viscosity measured as described above |
| DSC | Dow Silicones Corporation of Midland, Michigan, USA |
| DIS | Dow Industrial Solutions, a department of TDCC |
| FTIR | Fourier Transform-Infra Red |
| g/in | Grams per inch (g/2.54 cm) |
| g/mol | Grams per mole |
| GPC | Gel permeation chromatography |
| Me | methyl |
| mm | millimeters |
| Mn | Number average molecular weight |
| Ph | phenyl |
| rpm | revolutions per minute |
| TDCC | The Dow Chemical Company of Midland, Michigan, USA |
| μL or uL | microliters |
| μm or um | micrometers |
| Vi | vinyl |

Mn of the bis-hydroxyl-terminated polydiorganosiloxane and the polyorganosilicate resin may be measured by GPC according to the following technique. The chromatographic equipment was a Waters 2695 Separations Module equipped with a vacuum degasser, and a Waters 2414 refractive index detector. The separation was made with three Styragel™ HR columns (300 mm×7.8 mm) (molecular weight separation range of 100 to 4,000,000), preceded by a Styragel™ guard column (30 mm×4.6 mm). The analyses were performed using certified grade toluene flowing at 1.0 mL/min as the eluent, and the columns and detector were both heated to 45° C. 0.5% wt./v sample was prepared by weighing 0.025 g of neat sample into a 12-mL glass vial and diluting with 5 mL toluene. Sample solution was transferred to a glass autosampler vial after centrifuged or filtered through 0.45 μm PTFE filter. An injection volume of 100 μl was used and data was collected for 38 minutes. Data collection and analyses were performed using Waters Empower GPC software. Molecular weight averages were determined relative to a calibration curve (3rd order) created using polystyrene standards covering the molecular weight range of 370 g/mol-1,270,000 g/mol.

Viscosity of (A2) the bis-hydroxyl-terminated polydiorganosiloxane polymer used herein may be measured at 25° C. at 0.1 to 50 RPM on a Brookfield DV-III cone & plate viscometer with #CP-52 spindle, e.g., for polymers with viscosity of 120 to 250,000 mPa·s. One skilled in the art would recognize that as viscosity increases, rotation rate decreases.

What is claimed is:

1. An aqueous dispersion of a silicone pressure sensitive adhesive base, where said dispersion comprises starting materials (A) to (E), where
   starting material (A) is a bis-hydroxyl-terminated polydiorganosiloxane;
   starting material (B) is a polyorganosilicate resin;
   starting material (C) is cumene, in an amount of 1 weight part to 25 weight parts, per 100 weight parts of starting materials (A), (B), (C), and (D) combined;
   starting material (D) is a surfactant in an amount of 0.1 weight part to 20 weight parts, per 100 weight parts of starting materials (A), (B), (C), and (D) combined, where the surfactant comprises
      (D1) an alkyl polyglycoside surfactant and
      optionally (D2) a cosurfactant; and
   starting material (E) is water.

2. The aqueous dispersion of claim 1, where starting material (A) comprises:
   (A1) a gum of formula

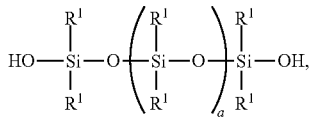

where each $R^1$ is an independently selected alkyl group of 1 to 12 carbon atoms, and subscript a has an average value sufficient to give the gum a plasticity of 20 mil (0.51 mm) to 80 mil (2.03 mm); and
   (A2) a polymer of formula

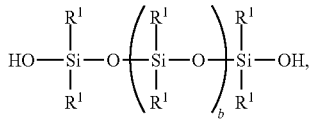

each $R^1$ is an independently selected alkyl group of 1 to 12 carbon atoms, and subscript b<a, and subscript b has an average value sufficient to give the polymer viscosity≤100,000 cSt measured at 25° C.; and
   where a weight ratio of (A1) the gum/(A2) the polymer [(A1)/(A2) ratio] is 0.1/1 to 1/1.

3. The aqueous dispersion of claim 2, where the (A1)/(A2) ratio is 0.67/1 to 1/1.

4. The aqueous dispersion of claim 1, where starting material (B) comprises:
   (B1) a capped resin comprising unit formula $(R^M{}_3SiO_{1/2})_z(SiO_{4/2})_o(X^2{}_{1/2})_P$, where $X^2$ is a hydroxyl group, each $R^M$ is an independently selected alkyl group of 1 to 4 carbon atoms, subscripts z and o represent mole fractions of monofunctional and tetrafunctional units, respectively, z>4, o>1, subscript p has a value sufficient to give the capped resin a hydroxyl group content<2%, and (B1) the capped resin has a number average molecular weight of 1,500 g/mol to 5,000 g/mol measured by gel permeation chromatography; and
   (B2) an uncapped resin comprising unit formula $(R^M{}_3SiO_{1/2})_{z'}(SiO_{4/2})_{o'}(X^2{}_{1/2})_{p'}$, where $X^2$ is a hydroxyl group, each $R^M$ is an independently selected alkyl group of 1 to 4 carbon atoms, subscripts z' and o' represent mole fractions of monofunctional and tetrafunctional units, respectively, z'>4, o'>1, subscript p' has a value sufficient to give the uncapped resin a hydroxyl group content≥2%, and (B2) the uncapped resin has a number average molecular weight of 1,500 g/mol to 5,000 g/mol measured by gel permeation chromatography.

5. The aqueous dispersion of claim 1, where (B) the polyorganosilicate resin and (A) the bis-hydroxyl-terminated polydiorganosiloxane are present in a weight ratio [(B)/(A) ratio] of 1/1 to 1.5/1.

6. The aqueous dispersion of claim 1, where cumene is present in an amount of 5 weight parts to 20 weight parts, per 100 weight parts of starting materials (A), (B), (C), and (D) combined.

7. The aqueous dispersion of claim 1, where starting material (D1) the alkylpolyglycoside surfactant comprises an alkyl polyglucoside surfactant of formula: $R^2O—(R^3O)_c—(Z)_d$, where $R^2$ is an alkyl group, each $R^3$ is an independently selected alkylene group of 2 to 4 carbon atoms, Z is a glucose moiety, subscript c is 0 to 10, and subscript d has an average value of 1 to 6.

8. The aqueous dispersion of claim 1, where starting material (D1), the alkyl polyglycoside surfactant is present in an amount of 2 weight parts to 10 weight parts, per 100 weight parts of starting materials (A), (B), (C), and (D) combined.

9. The aqueous dispersion of claim 1, where starting material (D2) the cosurfactant is present in an amount of 0.1% to 5% based on combined weights of (A) to (D).

10. The aqueous dispersion of claim 1, where starting material (E) the water is present in an amount of 30 weight parts to 85 weight parts, per 100 weight parts of starting materials (A) to (D) combined.

11. The aqueous dispersion of claim 1, further comprising 0.5 weight part to 6 weight parts, per 100 weight parts of starting materials (A), (B), (C), and (D) combined, of a peroxide compound.

12. The aqueous dispersion of claim 1, further comprising 0.1 weight part to 6 weight part, per 100 weight parts of starting materials (A), (B), (C), and (D) combined, of an aminosilane.

13. A method for preparing the aqueous dispersion of claim 1, the method comprising:
   1) dissolving (B) the polyorganosilicate resin in (C) the cumene to form a solution, and
   2) emulsifying the solution, (A) the bis-hydroxyl-terminated polydiorganosiloxane, (D) the surfactant, and (E) the water.

14. A method for preparing an aqueous dispersion of a silicone pressure sensitive adhesive composition, the method comprising: combining the aqueous dispersion prepared by the method of claim 13 and a curing agent selected from the group consisting of a peroxide compound and an aminosilane.

15. A method for forming a pressure sensitive adhesive article, the method comprising:
  optionally i) treating a surface of a substrate,
  ii) coating the surface of the substrate with the aqueous dispersion of the silicone pressure sensitive adhesive composition prepared by the method of claim 14,
  iii) removing water, and
  iv) curing the silicone pressure sensitive adhesive composition to form a silicone pressure sensitive adhesive on the surface of the substrate.

\* \* \* \* \*